(12) United States Patent
Charbonnier et al.

(10) Patent No.: US 11,414,721 B2
(45) Date of Patent: Aug. 16, 2022

(54) METHOD FOR THE MANUFACTURE OF TWIP STEEL SHEET HAVING AN AUSTENITIC MATRIX

(71) Applicant: ARCELORMITTAL, Luxembourg (LU)

(72) Inventors: Nicolas Charbonnier, Metz (FR); Gerard Petitgand, Plesnois (FR); Sebastien Allain, Pont a Mousson (FR); Marie-Christine Theyssier, Metz (FR)

(73) Assignee: ArcelorMittal, Luxembourg (LU)

( * ) Notice: Subject to any disclaimer, the term of this patent is extended or adjusted under 35 U.S.C. 154(b) by 424 days.

(21) Appl. No.: 16/302,982

(22) PCT Filed: May 18, 2017

(86) PCT No.: PCT/IB2017/000591
§ 371 (c)(1),
(2) Date: Nov. 19, 2018

(87) PCT Pub. No.: WO2017/203341
PCT Pub. Date: Nov. 30, 2017

(65) Prior Publication Data
US 2019/0218638 A1    Jul. 18, 2019

(30) Foreign Application Priority Data
May 24, 2016    (WO) .................. PCT/IB2016/000702

(51) Int. Cl.
*C21D 9/46*    (2006.01)
*C21D 6/00*    (2006.01)
(Continued)

(52) U.S. Cl.
CPC .............. *C21D 9/46* (2013.01); *B32B 15/013* (2013.01); *C21D 6/005* (2013.01); *C21D 6/008* (2013.01);
(Continued)

(58) Field of Classification Search
CPC .......... C21D 9/46; C21D 6/005; C21D 6/008; C21D 8/0205; C21D 8/0226;
(Continued)

(56) References Cited

U.S. PATENT DOCUMENTS

| 5,431,753 A | 7/1995 | Kim et al. |
| 2006/0179638 A1 | 8/2006 | Engl et al. |

(Continued)

FOREIGN PATENT DOCUMENTS

| CN | 102418032 A | 4/2012 |
| EP | 1573075 A1 | 9/2005 |

(Continued)

OTHER PUBLICATIONS

KR20090070502A English translation (Year: 2020).*
(Continued)

*Primary Examiner* — Robert S Jones, Jr.
*Assistant Examiner* — Jiangtian Xu
(74) *Attorney, Agent, or Firm* — Davidson, Davidson & Kappel, LLC

(57) ABSTRACT

A method for the manufacture of a TWIP steel is provided including: (A) feeding of a slab comprising by weight: 0.5<C<1.2%, 13.0≤Mn<25.0%, S≤0.030%, P≤0.080%, N≤0.1%, Si≤3.0%, 0.051%≤Al≤4.0%, 0.1≤V≤2.5%, and on a purely optional basis, one or more of Nb≤0.5%, B≤0.005%, Cr≤1.0%, Mo≤0.40%, Ni≤1.0%, Cu≤5.0%, Ti≤0.5%, 0.06≤Sn≤0.2%, the remainder of the composition being made of iron and inevitable impurities resulting from the elaboration, (B) reheating the slab and hot rolling the slab to provide a hot rolled slab, (C) coiling the hot rolled slab to provide a coiled slab, (D) first cold-rolling the coiled slab to provide a first cold rolled slab, (E) recrystallization annealing the first cold rolled slab such that an annealed steel sheet having an $UTS_{annealed}$ is obtained and (F) second
(Continued)

cold-rolling the annealed steel sheet with a reduction rate CR % that satisfies the following equation A: $1216.472 - 0.98795*UTS_{annealed} \leq (-0.0008*UTS_{annealed}+1.0124)*CR\%^2 + (0.0371*UTS_{annealed}-29.583)*CR\%$.

36 Claims, 1 Drawing Sheet

(51) Int. Cl.
| | |
|---|---|
| C21D 8/02 | (2006.01) |
| C23C 2/06 | (2006.01) |
| C22C 38/02 | (2006.01) |
| C22C 38/06 | (2006.01) |
| C23C 2/02 | (2006.01) |
| C23C 2/40 | (2006.01) |
| C22C 38/12 | (2006.01) |
| C22C 38/16 | (2006.01) |
| C23C 2/12 | (2006.01) |
| C22C 38/04 | (2006.01) |
| C22C 38/00 | (2006.01) |
| C21D 8/04 | (2006.01) |
| B32B 15/01 | (2006.01) |
| C22C 38/20 | (2006.01) |
| C22C 38/24 | (2006.01) |
| C22C 38/38 | (2006.01) |
| C23F 17/00 | (2006.01) |

(52) U.S. Cl.
CPC ......... *C21D 8/0205* (2013.01); *C21D 8/0226* (2013.01); *C21D 8/0236* (2013.01); *C21D 8/0273* (2013.01); *C21D 8/0278* (2013.01); *C21D 8/0468* (2013.01); *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/16* (2013.01); *C22C 38/20* (2013.01); *C22C 38/24* (2013.01); *C22C 38/38* (2013.01); *C23C 2/02* (2013.01); *C23C 2/06* (2013.01); *C23C 2/12* (2013.01); *C23C 2/40* (2013.01); *C23F 17/00* (2013.01); *C21D 2211/001* (2013.01); *C21D 2211/004* (2013.01)

(58) Field of Classification Search
CPC .. C21D 8/0236; C21D 8/0273; C21D 8/0278; C21D 8/0468; C21D 2211/001; C21D 2211/004; B32B 15/013; C22C 38/00; C22C 38/001; C22C 38/02; C22C 38/04; C22C 38/06; C22C 38/12; C22C 38/16; C22C 38/20; C22C 38/24; C22C 38/38; C23C 2/02; C23C 2/06; C23C 2/12; C23C 2/40; C23F 17/00

See application file for complete search history.

(56) References Cited

U.S. PATENT DOCUMENTS

| | | |
|---|---|---|
| 2006/0278309 A1 | 12/2006 | Bouzekri et al. |
| 2008/0035248 A1 | 2/2008 | Cugy et al. |
| 2008/0035249 A1 | 2/2008 | Scott et al. |
| 2009/0308499 A1 | 12/2009 | Scott et al. |
| 2013/0118647 A1 | 5/2013 | Berkhout et al. |
| 2013/0177780 A1 | 7/2013 | Park et al. |
| 2013/0209831 A1 | 8/2013 | Becker et al. |
| 2013/0209833 A1 | 8/2013 | Scott et al. |
| 2013/0295409 A1* | 11/2013 | Chin ..................... C23C 2/28 428/653 |
| 2014/0251505 A1* | 9/2014 | Blumenau ............. C21D 6/005 148/287 |
| 2015/0090372 A1 | 4/2015 | Branagan et al. |
| 2016/0186285 A1 | 6/2016 | Kim et al. |
| 2019/0010597 A1* | 1/2019 | Kim ..................... C22C 38/28 |
| 2019/0292617 A1 | 6/2019 | Iung et al. |
| 2019/0218639 A1 | 7/2019 | Scott et al. |

FOREIGN PATENT DOCUMENTS

| | | | |
|---|---|---|---|
| EP | 1878811 A1 | | 1/2008 |
| EP | 2431492 A2 | | 3/2012 |
| EP | 2653581 A2 | | 10/2013 |
| JP | S63235428 A | | 9/1988 |
| JP | 2006509912 A | | 3/2006 |
| JP | 2014505168 A | | 2/2014 |
| JP | 2016534224 A | | 11/2016 |
| KR | 20090070502 A | * | 7/2009 |
| KR | 20090072118 A | | 7/2009 |
| KR | 20130111214 | | 10/2013 |
| RU | 2074900 C1 | | 3/1997 |
| RU | 2361931 C2 | | 7/2009 |
| RU | 2366727 C2 | | 9/2009 |
| RU | 2417265 C2 | | 4/2011 |
| RU | 2524027 C1 | | 7/2014 |
| RU | 2554264 C2 | | 6/2015 |
| WO | 2004055223 A1 | | 7/2004 |
| WO | 2008078940 A1 | | 7/2008 |

OTHER PUBLICATIONS

KR20090070502A English translation by machine. (Year: 2020).*
Kuhn et al ("Mechanical Testing for Metalworking Processes", ASM Handbook, vol. 8: Mechanical Testing and Evaluation, 2000). (Year: 2000).*

* cited by examiner

METHOD FOR THE MANUFACTURE OF TWIP STEEL SHEET HAVING AN AUSTENITIC MATRIX

FIELD OF THE INVENTION

The present invention relates to a method for producing a TWIP steel sheet having an austenitic matrix. The invention is particularly well suited for the manufacture of automotive vehicles.

BACKGROUND

With a view of saving the weight of vehicles, it is known to use high strength steels for the manufacture of automobile vehicle. For example for the manufacture of structural parts, mechanical properties of such steels have to be improved. However, even if the strength of the steel is improved, the elongation and therefore the formability of high steels decreased. In order to overcome these problems, twinning induced plasticity steels (TWIP steels) having good formability have appeared. Even if the product shows a very good formability, mechanical properties such as Ultimate Tensile Stress and Yield Stress may not be high enough to fulfill automotive application.

The patent application US2006278309 discloses a hot-rolled austenitic iron/carbon/manganese steel sheet, the strength of which is greater than 900 MPa, the product (strength (in MPa)*elongation at fracture (in %)) of which is greater than 45000 and the chemical composition of which comprises, the contents being expressed by weight: $0.5\% \leq C \leq 0.7\%$, $17\% \leq Mn \leq 24\%$, $Si \leq 3\%$, $Al \leq 0.050\%$, $S \leq 0.030\%$, $P \leq 0.080\%$, $N \leq 0.1\%$, and, optionally, one or more elements such that: $Cr \leq 1\%$, $Mo \leq 0.40\%$, $Ni \leq 1\%$, $Cu \leq 5\%$, $Ti \leq 0.50\%$, $Nb \leq 0.50\%$ and $V \leq 0.50\%$, the composition further comprising iron and inevitable impurities resulting from the smelting, the recrystallized fraction of the steel being greater than 75%, the surface fraction of precipitated carbides of the steel being less than 1.5% and the mean grain size of the steel being less than 18 µm.

In this patent application, it is possible to obtain a cold-rolled austenitic iron/carbon/manganese steel sheet having a strength higher than 950 MPa after cold rolling. The thickness of the steel sheet may be reduced by cold rolling, not by means of a single rolling step but by two or more steps, each of the rolling steps being followed by an annealing operation. The grain size prior to the last rolling-and-annealing step must not exceed 18 microns, for fear of reducing the strength and the deformability of the end-product.

However, the strength of this austenitic steel sheet is not high enough. Indeed, in the examples, the maximum strength within the range of the invention is of 1130 MPa.

US2006/0179638 discloses a method for producing a steel product, in particular a steel sheet or steel strip, wherein a steel strip or sheet is produced from steel which contains (in % by weight): C: 1.00%, Mn: 7.00 to 30.00%, Al: 1.00 to 10.00%, Si: 2.50 to 8.00%, Al+Si: 3.50 to 12.00%, B: 0.01%, Ni: 8.00%, Cu: 3.00%, N: 0.60%, Nb: 0.30%, Ti: 0.30%, V: 0.30%, P: 0.01% and iron and unavoidable impurities as the remainder, from which strip or sheet the finished steel product is subsequently produced by cold forming that takes place at a degree of cold forming of 2 to 25%.

However, by applying this method, the tensile strength (Rm) obtained after a cold-forming having a degree between 2 and 25% is very low. Indeed, Examples show that the tensile strength is of 568 MPa maximum with a degree of cold forming of 10%, i.e. between 2 and 25. Moreover, in the comparative examples, the tensile strength is of 1051 MPa maximum with a degree of cold forming of 50%. Additionally, the uniform elongations fall very quickly when the degree of cold forming of 30 or 50%. Finally, the steel used in Examples, called light steel, has a very low quantity of Carbon (0.070% C) and a high quantity of Mn (25.9% Mn). This steel is very specific since the work hardening and the mechanical properties, in particular the yield strength, are very low. Therefore, this steel is not interesting for automotive industry.

CN102418032 discloses a manufacturing method for steel material, particularly to an annealing preparation process for enhancing a product of strength and elongation of a twinning-induced plasticity (TWIP) high-manganese steel sheet. This method comprises a hot-rolling followed by a cold rolling and heat treating the hot-rolled sheet for 2 to 4 rounds after pickling, with a heat treatment temperature of 800-1000° C. and a heat treatment duration of 10-30 minutes.

According to the production requirements, if the step (4) of cold rolling and heat treating the hot-rolled sheet after pickling is performed for three rounds of cold rolling and heat treatment process, the production steps are as follows: the first round of cold rolling and heat treatment comprises: cold rolling the hot-rolled sheet to 2.5~4 mm at room temperature, then maintaining the cold-rolled sheet in a heating furnace at a setting temperature of 860-880° C. for 10-15 minutes and air cooling the cold-rolled sheet; subsequently, the second round of cold rolling and heat treatment comprises: cold rolling the sheet having been cold-rolled and heat-treated in the first round to 1.0-2 mm, and then maintaining the sheet at a setting temperature of 880-900° C. for 10-15 minutes and air cooling the sheet; subsequently, the third round of cold rolling and heat treatment comprises: cold-rolling the sheet obtained from the second round to 0.8-1.5 mm, and then maintaining the sheet at a setting temperature of 880-950° C. for 10-30 minutes and air cooling the sheet; thereby, the air-cooled sheet is the finished TWIP steel sheet for use.

However, in this patent application, on the one hand, the percentage of reduction rate performed during the cold-rolling is not mentioned, on the other hand, in a preferred embodiment, three rounds of cold rolling and heat treatment process are performed resulting in a long process time and a decrease of the mechanical properties. Indeed, Example 1 obtained after three rounds of cold rolling and heat treatment process has a Tensile strength (MPa) of only 980 MPa and an elongation after fracture of 81%.

EP1878811 discloses a fabrication process of a steel sheet offering good resistance to delayed cracking, comprising the steps of:
Supplying a steel,
casting said steel in the form of a semi-product
reheating said semi-product
performing hot rolling said semi-product up to an end rolling temperature to obtain a sheet
coiling said sheet
optionally performing cold rolling and annealing,
Performing at least one soaking treatment where said sheet is soaked at a temperature comprised between 250 and 900 deg. C. during a time t of at least 15 s.

However, the disclosed method is a very specific method comprising a soaking treatment at this end in order to obtain a good resistance to delayed cracking. Additionally, there is no mention of a cold-rolling after the annealing step. The only cold rolling mentioned is performed before the annealing step. Moreover, the percentage of reduction rate of the cold-rolling is not mentioned. Finally, the steel composition comprises Al in an amount below or equal to 0.050% which is very low.

SUMMARY OF THE INVENTION

Thus, the object of the invention is to solve the above drawbacks by providing a method for the manufacture of a TWIP steel sheet having improved mechanical properties.

This object is achieved by providing a method for the manufacture of a TWIP steel sheet in accordance with an embodiment of the present invention comprising: (A) feeding of a slab comprising by weight: $0.5<C<1.2\%$, $13.0 \leq Mn<25.0\%$, $S \leq 0.030\%$, $P \leq 0.080\%$, $N \leq 0.1\%$, $Si \leq 3.0\%$, $0.051\% \leq Al \leq 4.0\%$, $0.1 \leq V \leq 2.5\%$, and on a purely optional basis, one or more of $Nb \leq 0.5\%$, $B \leq 0.005\%$, $Cr \leq 1.0\%$, $Mo \leq 0.40\%$, $Ni \leq 1.0\%$, $Cu \leq 5.0\%$, $Ti \leq 0.5\%$, $0.06 \leq Sn \leq 0.2\%$, the remainder of the composition being made of iron and inevitable impurities resulting from the elaboration, (B) reheating the slab and hot rolling the slab to provide a hot rolled slab, (C) coiling the hot rolled slab to provide a coiled slab, (D) first cold-rolling the coiled slab to provide a first cold rolled slab, (E) recrystallization annealing the first cold rolled slab such that an annealed steel sheet having an $UTS_{annealed}$ is obtained and (F) second cold-rolling the annealed steel sheet with a reduction rate CR % that satisfies the following equation A: $1216.472-0.98795*UTS_{annealed} \leq (-0.0008*UTS_{annealed}+1.0124)*CR \%^2+(0.0371*UTS_{annealed}-29.583)*CR \%$.

Another object is achieved by providing a TWIP steel sheet according to a second embodiment of the present invention which is obtained by performing the method according to the first embodiment having an UTS above 1200 MPa.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
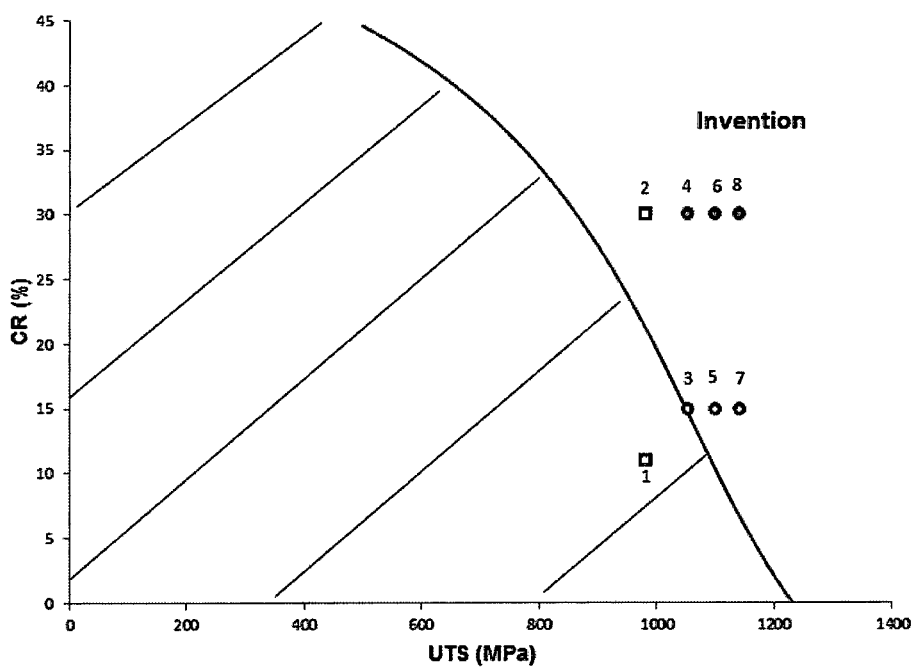
FIG. 1 illustrates one embodiment according to the present invention.

The following terms will be defined:
UTS: ultimate tensile strength,
$UTS_{annealed}$: ultimate tensile strength obtained after the recrystallization annealing,
TE: total elongation,
$TE_{annealed}$: total elongation obtained after the recrystallization annealing and
CR %: reduction rate of the second cold-rolling.

In accordance with an embodiment of the present invention, a method for producing a TWIP steel sheet comprising the following steps:
A. feeding of a slab having steel sheet comprising by weight:
$0.5<C<1.2\%$,
$13.0 \leq Mn<25.0\%$,
$S \leq 0.030\%$,
$P \leq 0.080\%$,
$N \leq 0.1\%$,
$Si \leq 3.0\%$,
$0.051\% \leq Al \leq 4.0\%$,
and on a purely optional basis, one or more elements such as
$Nb \leq 0.5\%$,
$B \leq 0.005\%$,
$Cr \leq 1.0\%$,
$Mo \leq 0.40\%$,
$Ni \leq 1.0\%$,
$Cu \leq 5.0\%$,
$Ti \leq 0.5\%$,
$V \leq 2.5\%$,
$0.06 \leq Sn \leq 0.2\%$,
the remainder of the composition being made of iron and inevitable impurities resulting from the elaboration,
B. Reheating such slab and hot rolling it,
C. A coiling step,
D. A first cold-rolling,
E. A recrystallization annealing such that an annealed steel sheet having an $UTS_{annealed}$ is obtained and
F. A second cold-rolling with a reduction rate CR % that satisfies the following equation A:

$$1216.472-0.98795*UTS_{annealed} \leq (-0.0008*UTS_{annealed}+1.0124)*CR \%^2+(0.0371*UTS_{annealed}-29.583)*CR \%$$

Without willing to be bound by any theory it seems that when the method according to the present invention is applied, in particular when the reduction rate of the second cold-rolling satisfies the equation A, it makes it possible to obtain a TWIP steel sheet having improved mechanical properties, specially a higher strength.

Regarding the chemical composition of the steel, C plays an important role in the formation of the microstructure and the mechanical properties. It increases the stacking fault energy and promotes stability of the austenitic phase. When combined with a Mn content ranging from 13.0 to 25.0% by weight, this stability is achieved for a carbon content of 0.5% or higher. In case there are vanadium carbides, a high Mn content may increase the solubility of vanadium carbide (VC) in austenite. However, for a C content above 1.2%, there is a risk that the ductility decreases due to for example an excessive precipitation of vanadium carbides or carbonitrides. Preferably, the carbon content is between 0.4 and 1.2%, more preferably between 0.5 and 1.0% by weight so as to obtain sufficient strength.

Mn is also an essential element for increasing the strength, for increasing the stacking fault energy and for stabilizing the austenitic phase. If its content is less than 13.0%, there is a risk of martensitic phases forming, which very appreciably reduce the deformability. Moreover, when the manganese content is greater than 25.0%, formation of twins is suppressed, and accordingly, although the strength increases, the ductility at room temperature is degraded. Preferably, the manganese content is between 15.0 and 24.0% and more preferably 17.0 and 24.0% so as to optimize the stacking fault energy and to prevent the formation of martensite under the effect of a deformation. Moreover, when the Mn content is greater than 24.0%, the mode of deformation by twinning is less favored than the mode of deformation by perfect dislocation glide.

Al is a particularly effective element for the deoxidation of steel. Like C, it increases the stacking fault energy which reduces the risk of forming deformation martensite, thereby improving ductility and delayed fracture resistance. However, Al is a drawback if it is present in excess in steels having a high Mn content, because Mn increases the solubility of nitrogen in liquid iron. If an excessively large amount of Al is present in the steel, the N, which combines with Al, precipitates in the form of aluminum nitrides (AlN) that impede the migration of grain boundaries during hot conversion and very appreciably increases the risk of cracks appearing in continuous casting. In addition, as will be explained later, a sufficient amount of N must be available in order to form fine precipitates, essentially of carbonitrides. Preferably, the Al content is below or equal to 2.0%. When the Al content is greater than 4.0%, there is a risk that the formation of twins is suppressed decreasing the ductility. Preferably, the amount of Al is above 0.06%, advantageously above 0.1% and more preferably above 1.0%.

Correspondingly, the nitrogen content must be 0.1% or less so as to prevent the precipitation of AlN and the formation of volume defects (blisters) during solidification. In addition, when elements capable of precipitating in the form of nitrides, such as vanadium, niobium, titanium, chromium, molybdenum and boron, the nitrogen content must not exceed 0.1%.

Optionally, the amount of V is below or equal to 2.5%, preferably between 0.1 and 1.0%. Preferably, V forms precipitates. Preferably, the volumic fraction of such elements in steel is between 0.0001 and 0.025%. Preferably, vanadium elements are mostly localized in intragranular position. Advantageously, vanadium elements have a mean size below 7 nm, preferably between 1 and 5 nm and more preferably between 0.2 and 4.0 nm.

Silicon is also an effective element for deoxidizing steel and for solid-phase hardening. However, above a content of 3%, it reduces the elongation and tends to form undesirable oxides during certain assembly processes, and it must therefore be kept below this limit. Preferably, the content of silicon is below or equal to 0.6%.

Sulfur and phosphorus are impurities that embrittle the grain boundaries. Their respective contents must not exceed 0.030 and 0.080% so as to maintain sufficient hot ductility.

Some Boron may be added up to 0.005%, preferably up to 0.001%. This element segregates at the grain boundaries and increases their cohesion. Without intending to be bound to a theory, it is believed that this leads to a reduction in the residual stresses after shaping by pressing, and to better resistance to corrosion under stress of the thereby shaped parts. This element segregates at the austenitic grain boundaries and increases their cohesion. Boron precipitates for example in the form of borocarbides and boronitrides.

Nickel may be used optionally for increasing the strength of the steel by solution hardening. However, it is desirable, among others for cost reasons, to limit the nickel content to a maximum content of 1.0% or less and preferably between below 0.3%.

Likewise, optionally, an addition of copper with a content not exceeding 5% is one means of hardening the steel by precipitation of copper metal. However, above this content, copper is responsible for the appearance of surface defects in hot-rolled sheet. Preferably, the amount of copper is below 2.0%. Preferably, the amount of Cu is above 0.1%.

Titanium and Niobium are also elements that may optionally be used to achieve hardening and strengthening by forming precipitates. However, when the Nb or Ti content is greater than 0.50%, there is a risk that an excessive precipitation may cause a reduction in toughness, which has to be avoided. Preferably, the amount of Ti is between 0.040 and 0.50% by weight or between 0.030% and 0.130% by weight. Preferably, the titanium content is between 0.060% and 0.40 and for example between 0.060% and 0.110% by weight. Preferably, the amount of Nb is above 0.01% and more preferably between 0.070 and 0.50% by weight or 0.040 and 0.220%. Preferably, the niobium content is between 0.090% and 0.40% and advantageously between 0.090% and 0.200% by weight.

Chromium and Molybdenum may be used as optional element for increasing the strength of the steel by solution hardening. However, since chromium reduces the stacking fault energy, its content must not exceed 1.0% and preferably between 0.070% and 0.6%. Preferably, the chromium content is between 0.20 and 0.5%. Molybdenum may be added in an amount of 0.40% or less, preferably in an amount between 0.14 and 0.40%.

Furthermore, without willing to be bound by any theory, it seems that precipitates of vanadium, titanium, niobium, chromium and molybdenum can reduce the sensitivity to delayed cracking, and do so without degrading the ductility and toughness properties. Thus, preferably, at least one element chosen from titanium, niobium, chromium and molybdenum under the form of carbides, nitrides and carbonitrides are present in the steel.

Optionally, tin (Sn) is added in an amount between 0.06 and 0.2% by weight. without willing to be bound by any theory, it is believed that since tin is a noble element and does not form a thin oxide film at high temperatures by itself, Sn is precipitated on a surface of a matrix in an annealing prior to a hot dip galvanizing to suppress a pro-oxidant element such as Al, Si, Mn, or the like from being diffused into the surface and forming an oxide, thereby improving galvanizability. However, when the added amount of Sn is less than 0.06%, the effect is not distinct and an increase in the added amount of Sn suppresses the formation of selective oxide, whereas when the added amount of Sn exceeds 0.2%, the added Sn causes hot shortness to deteriorate the hot workability. Therefore, the upper limit of Sn is limited to 0.2% or less.

The steel can also comprise inevitable impurities resulting from the development. For example, inevitable impurities can include without any limitation: O, H, Pb, Co, As, Ge, Ga, Zn and W. For example, the content by weight of each impurity is inferior to 0.1% by weight.

According to an embodiment of the the present invention, the method comprises the feeding step A) of a semi product, such as slabs, thin slabs, or strip made of steel having the composition described above, such slab is cast. Preferably, the cast input stock is heated to a temperature above 1000° C., more preferably above 1050° C. and advantageously between 1100 and 1300° C. or used directly at such a temperature after casting, without intermediate cooling.

The hot-rolling is then performed at a temperature preferably above 890° C., or more preferably above 1000° C. to obtain for example a hot-rolled strip usually having a thickness of 2 to 5 mm, or even 1 to 5 mm. To avoid any cracking problem through lack of ductility, the end-of-rolling temperature is preferably above or equal to 850° C.

After the hot-rolling, the strip has to be coiled at a temperature such that no significant precipitation of carbides (essentially cementite (Fe,Mn)$_3$C)) occurs, something which would result in a reduction in certain mechanical properties. The coiling step C) is realized at a temperature below or equal to 580° C., preferably below or equal to 400° C.

A subsequent cold-rolling operation followed by a recrystallization annealing is carried out. These additional steps result in a grain size smaller than that obtained on a hot-rolled strip and therefore results in higher strength properties. Of course, it must be carried out if it is desired to obtain products of smaller thickness, ranging for example from 0.2 mm to a few mm in thickness and preferably from 0.4 to 4 mm.

A hot-rolled product obtained by the process described above is cold-rolled after a possible prior pickling operation has been performed in the usual manner.

The first cold-rolling step D) is performed with a reduction rate between 30 and 70%, preferably between 40 and 60%.

After this rolling step, the grains are highly work-hardened and it is necessary to carry out a recrystallization annealing operation. This treatment has the effect of restoring the ductility and simultaneously reducing the strength. Preferably, this annealing is carried out continuously. Advantageously, the recrystallization annealing E) is realized between 700 and 900° C., preferably between 750 and 850° C., for example during 10 to 500 seconds, preferably between 60 and 180 seconds.

According to embodiments of the present invention, the UTS value of a steel sheet obtained after the recrystallization annealing is called $UTS_{annealed}$. Preferably, after the recrystallization annealing step E), the annealed steel sheet has an $UTS_{annealed}$ above 800 MPa, preferably between 800 and 1400 MPa and more preferably between 1000 and 1400 MPa.

Preferably, the TE value of a steel sheet obtained after the recrystallization annealing is called TE annealed. In this preferred embodiment, the steel sheet has a $TE_{annealed}$ above 10%, preferably above 15% and more preferably between 30 and 70%.

Then, the second cold-rolling is realized with a reduction rate that satisfies the equation A.

In a preferred embodiment, the second cold-rolling step F) is realized with a reduction rate CR % that further satisfies the following equation B:

$$\frac{CR\%}{18.2} \le \ln\left(\frac{TEannealed\%}{10}\right)$$

Without willing to be bound by any theory, it seems that when the method according to the present invention is applied, in particular when the reduction rate of the second cold-rolling further satisfies the above equation, it makes it possible to obtain a TWIP steel sheet having further improved mechanical properties, specially a higher elongation.

Preferably, the second cold-rolling step F) is realized with a reduction rate between 1 to 50%, preferably between 1 and 25% or between 26 and 50%. It allows the reduction of the steel thickness. Moreover, the steel sheet manufactured according to the aforesaid method, may have increased strength through strain hardening by undergoing a re-rolling step. Additionally, this step induces a high density of twins improving thus the mechanical properties of the steel sheet.

After the second cold-rolling, a hot-dip coating step G) can be performed. Preferably, step G) is realized with an aluminum-based bath or a zinc-based bath.

In a preferred embodiment, the hot-dip coating step is performed with an aluminum-based bath comprises less than 15% Si, less than 5.0% Fe, optionally 0.1 to 8.0% Mg and optionally 0.1 to 30.0% Zn, the remainder being Al.

In another preferred embodiment, the hot-dip coating step is performed with a zinc-based bath comprises 0.01-8.0% Al, optionally 0.2-8.0% Mg, the remainder being Zn.

The molten bath can also comprise unavoidable impurities and residuals elements from feeding ingots or from the passage of the steel sheet in the molten bath.

For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0%, by weight.

For example, an annealing step can be performed after the coating deposition in order to obtain a galvannealed steel sheet.

A TWIP steel sheet having an ultimate tensile strength (UTS) above 1200 MPa, preferably between 1200 and 1600 MPa is thus obtained. Preferably, the total elongation (TE) is above 10%, more preferably above 15% and more preferably between 15 and 50%.

Example

In this example, TWIP steel sheets having the following weight composition were used:

| Grade | C % | Si % | Mn % | P % | Cr % | Al % | % Cu | % V | % N |
|---|---|---|---|---|---|---|---|---|---|
| 1 | 0.595 | 0.205 | 18.3 | 0.035 | — | 0.782 | 1.7 | 0.18 | 0.01 |
| 2 | 0.88 | 0.508 | 17.96 | 0.03 | 0.109 | 2.11 | 0.15 | 0.093 | 0.0044 |
| 3 | 0.876 | 0.502 | 17.63 | 0.032 | 0.108 | 2.78 | 0.149 | 0.384 | 0.0061 |
| 4 | 1.04 | 0.505 | 17.69 | 0.034 | 0.108 | 2.8 | 0.147 | 0.447 | 0.0069 |

Firstly, the samples were heated and hot-rolled at a temperature of 1200° C. The finishing temperature of hot-rolling was set to 890° C. and the coiling was performed at 400° C. after the hot-rolling. Then, a 1$^{st}$ cold-rolling was realized with a cold-rolling reduction ratio of 50%. Thereafter, a recrystallization annealing was performed at 750° C. during 180 seconds. The UTS annealed and $TE_{annealed}$ obtained after the recrystallization annealing step were determined.

Afterwards, the 2$^{nd}$ cold-rolling was realized with different cold-rolling reduction ratios. Results are shown in the following Table:

| Trials | Grade | $UTS_{annealed}$ (MPa) | TE (%) | 2$^{nd}$ cold-rolling (%) | Equation A satisfied | UTS (MPa) | Equation B satisfied | TE (%) |
|---|---|---|---|---|---|---|---|---|
| 1 | 1 | 980 | ND | 11 | No | 1095 | ND | ND |
| 2* | 1 | 980 | ND | 30 | Yes | 1425 | ND | ND |
| 3* | 2 | 1053 | 67 | 15 | Yes | 1292 | Yes | 37 |
| 4* | 2 | 1053 | 67 | 30 | Yes | 1476 | Yes | 16 |

| Trials | Grade | UTS$_{annealed}$ (MPa) | TE (%) | 2$^{nd}$ cold-rolling (%) | Equation A satisfied | UTS (MPa) | Equation B satisfied | TE (%) |
|---|---|---|---|---|---|---|---|---|
| 5* | 3 | 1100 | 36 | 15 | Yes | 1352 | Yes | 21 |
| 6* | 3 | 1100 | 36 | 30 | Yes | 1659 | No | 7 |
| 7* | 4 | 1140 | 37 | 15 | Yes | 1420 | Yes | 19 |
| 8* | 4 | 1140 | 37 | 30 | Yes | 1741 | No | 8 |

*examples according to the present invention;
ND = not done

Results show that when the method according to the present invention is applied, in particular when the equation A is satisfied, the mechanical properties of the TWIP steel sheet are highly improved.

FIG. 1 shows the value of UTS obtained after the second cold-rolling for Trials 1 to 8. For Trials 2 to 8, Equation A is satisfied meaning that UTS is highly improved.

Figure 2:
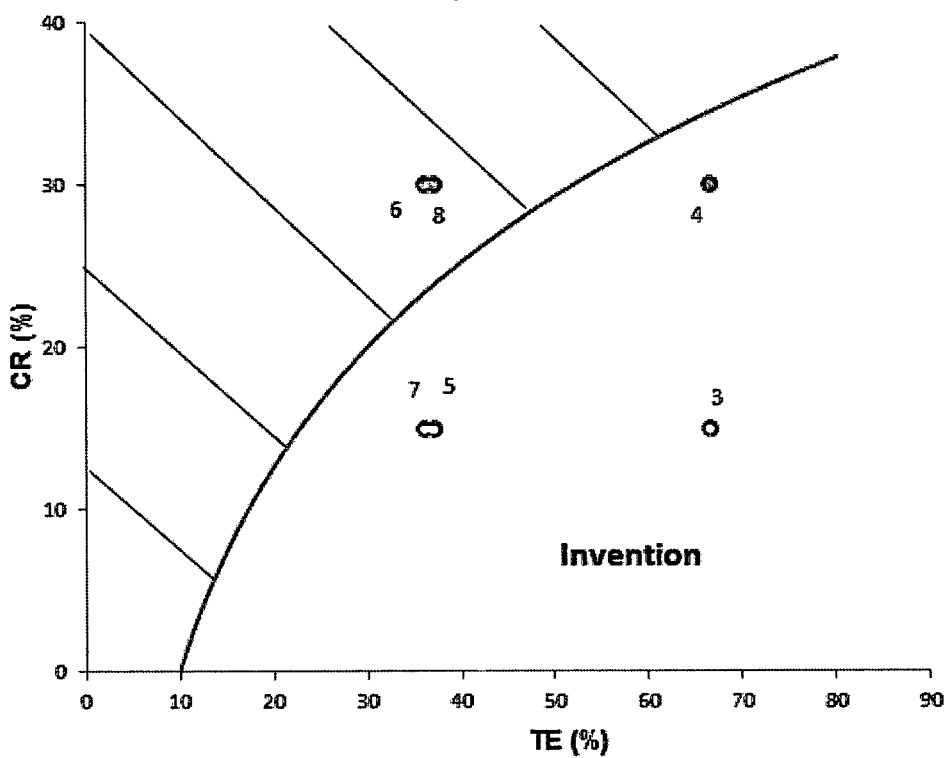
FIG. 2 illustrates another embodiment according to the present invention.

FIG. 2 shows the value of TE obtained after the second cold-rolling for Trials 3 to 8. For Trials 3, 4, 5 and 7, Equation B is further satisfied which means that both UTS and TE are highly improved.

What is claimed is:

1. A method for producing a TWIP steel sheet comprising:
A. feeding a slab comprising by weight:
   0.5<C<1.2%,
   13.0≤Mn<25.0%,
   S≤0.030%,
   P≤0.080%,
   N≤0.1%,
   Si≤3.0%,
   0.051%≤Al<4.0%,
   0.1≤V≤2.5%,
   the remainder of the composition being made of iron and inevitable impurities resulting from elaboration,
B. reheating the slab and hot rolling the slab to provide a hot rolled slab,
C. coiling the hot rolled slab to provide a coiled slab,
D. first cold-rolling the coiled slab to provide a first cold rolled slab,
E. recrystallization annealing the first cold rolled slab such that an annealed steel sheet having an UTS$_{annealed}$ is obtained,
F. second cold-rolling the annealed steel sheet with a reduction rate CR % that satisfies the following equation A:

1216.472−0.98795*UTS$_{annealed}$≤(−0.0008*UTS$_{annealed}$+1.0124)*CR %$^2$+(0.0371*UTS$_{annealed}$−29.583)*CR %, and G. determining the UTS$_{annealed}$ before the second cold-rolling.

2. The method according to claim 1, wherein the composition further includes, one or more of
Nb≤0.5%,
B≤0.005%,
Cr≤1.0%,
Mo≤0.40%,
Ni≤1.0%,
Cu≤5.0%,
Ti≤0.5%, and
0.06≤Sn≤0.2%.

3. The method according to claim 1, wherein the amount of Al is above 0.06% in the slab.

4. The method according to claim 1, wherein the reheating is performed at a temperature above 1000° C. and the hot rolling has a final rolling temperature of at least 850° C.

5. The method according to claim 1, wherein the coiling is at a temperature below or equal to 580° C.

6. The method according to claim 1, wherein the first cold-rolling step (D) is realized with a reduction rate between 30 and 70%.

7. The method according to of claim 1, wherein the first cold-rolling step (D) is realized with a reduction rate between 40 and 60%.

8. The method according to claim 1, wherein the recrystallization annealing step (E) is at a temperature between 700 and 900° C.

9. The method according to claim 1, wherein the UTS$_{annealed}$ obtained after the recrystallization annealing is above 800 MPa.

10. The method according to claim 9, wherein the UTS$_{annealed}$ is between 800 and 1400 MPa.

11. The method according to claim 10, wherein the UTS$_{annealed}$ is between 1000 and 1400 MPa.

12. The method according to claim 1, wherein a total elongation obtained after the recrystallization annealing TE % annealed is above 10%.

13. The method according to claim 12, wherein the TE % annealed is above 15%.

14. The method according to claim 13, wherein the TE % annealed is between 30% and 70%.

15. The method according claim 1, wherein the second cold-rolling step (F) is realized with a reduction rate that further satisfies the following equation B:

$$\frac{CR\%}{18.2} \leq \ln\left(\frac{TEannealed\%}{10}\right).$$

16. The method according to claim 1, wherein the second cold-rolling step (F) is realized with a reduction rate between 1 to 50%.

17. The method according claim 16, wherein the second cold-rolling step (F) is realized with a reduction rate between 1 and 25%.

18. The method according to claim 16, wherein the second cold-rolling step (F) is realized with a reduction rate between 26 and 50%.

19. The method according to claim 1, wherein after the second cold-rolling step (F), a hot-dip coating step (F') is performed.

20. The method according to claim 19, wherein the the hot-dip coating step (F') is performed with an aluminum-based bath or a zinc-based bath.

21. The method according to claim 20, wherein the aluminum-based bath comprises less than 15% Si, less than 5.0% Fe, optionally 0.1 to 8.0% Mg and optionally 0.1 to 30.0% Zn, the remainder being Al.

22. The method according to claim 20, wherein the zinc-based bath comprises 0.01-8.0% Al, optionally 0.2-8.0% Mg, the remainder being Zn.

23. The method as recited in claim 1 wherein after the second cold-rolling the steel sheet has a UTS above 1200 MPa.

24. The method as recited in claim 1 wherein after the second cold-rolling the steel sheet has a TE above 10%.

25. The method as recited in claim 1 wherein the reheating is performed at a temperature above 1000° C., the hot rolling has a final rolling temperature of at least 850° C., the coiling temperature is at a temperature below or equal to 580° C. and the first cold-rolling step (D) is realized with a reduction rate between 30 and 70%.

26. The method as recited in claim 3 wherein the first cold-rolling step (D) is realized with a reduction rate between 30 and 70%.

27. The method as recited in claim 8, wherein the recrystallization annealing step (E) is at a temperature between 750 and 850° C. and for a duration of 10 to 500 seconds.

28. The method as recited in claim 1, wherein the determining $UTS_{annealed}$ is between the recrystallization annealing and the second cold-rolling.

29. The method of claim 28, further comprising determining a value of $1216.472-0.98795*UTS_{annealed}$ before the second cold-rolling.

30. The method as recited in claim 17, wherein the second cold-rolling step (F) is realized with a reduction rate between 1 and 15%.

31. A method for producing a TWIP steel sheet comprising:
   A. feeding a slab comprising by weight:
      $0.5<C<1.2\%$,
      $13.0<Mn<25.0\%$,
      $S\leq0.030\%$,
      $P\leq0.080\%$,
      $N\leq0.1\%$,
      $Si\leq3.0\%$,
      $0.051\%\leq Al\leq4.0\%$,
      $0.1\leq V\leq2.5\%$,
   the remainder of the composition being made of iron and inevitable impurities resulting from elaboration,
   B. reheating the slab and hot rolling the slab at a temperature above 1000° C. and hot rolling it to a final rolling temperature of at least 850° C. to provide a hot rolled slab,
   C. coiling the hot rolled slab at a temperature below or equal to 580° C. to provide a coiled slab,
   D. first cold-rolling the coiled slab with a reduction rate between 30 and 70% to provide a first cold rolled slab,
   E. recrystallization annealing the first cold rolled slab between 700 and 900° C. such that an annealed steel sheet having an $UTS_{annealed}$ is obtained,
   F. second cold-rolling the annealed steel sheet with a reduction rate CR % that satisfies the following equation A:

$$1216.472-0.98795*UTS_{annealed}\leq(-0.0008*UTS_{annealed}+1.0124)*CR\%^2+(0.0371*UTS_{annealed}-29.583)*CR\%.$$

32. The method according to claim 31, wherein after the second cold-rolling step (F), a hot-dip coating step (G) is performed.

33. The method as recited in claim 31, wherein the recrystallization annealing step (E) is at a temperature between 750 and 850° C. and for a duration of 10 to 500 seconds.

34. The method as recited in claim 31, wherein the second cold-rolling step (F) is realized with a reduction rate between 1 and 15%.

35. The method as recited in claim 31, wherein the recrystallization annealing step (E) is at a temperature higher than 750° C.

36. The method of claim 31, further comprising determining a value of $1216.472-0.98795*UTS_{annealed}$ before the second cold-rolling.

* * * * *